(12) United States Patent
Nandyalam et al.

(10) Patent No.: US 9,342,349 B2
(45) Date of Patent: May 17, 2016

(54) SYSTEMS AND METHODS FOR PHYSICAL AND LOGICAL RESOURCE PROFILING, ANALYSIS AND BEHAVIORAL PREDICTION

(71) Applicant: VCE Company, LLC, Richardson, TX (US)

(72) Inventors: Rajesh Nandyalam, Whitinsville, MA (US); Stephen C. Steir, Hopkinton, MA (US); Joshua P. Onffroy, Upton, MA (US)

(*) Notice: Subject to any disclaimer, the term of this patent is extended or adjusted under 35 U.S.C. 154(b) by 60 days.

(21) Appl. No.: 14/257,225

(22) Filed: Apr. 21, 2014

(65) Prior Publication Data
US 2015/0301853 A1    Oct. 22, 2015

(51) Int. Cl.
*G06F 9/46* (2006.01)
*G06F 9/48* (2006.01)
*G06F 9/50* (2006.01)

(52) U.S. Cl.
CPC .............. *G06F 9/46* (2013.01); *G06F 9/4893* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 7,272,735 | B2 * | 9/2007 | Fung | G06F 1/3203 713/320 |
| 7,484,111 | B2 * | 1/2009 | Fung | G06F 1/3203 713/320 |
| 7,644,148 | B2 * | 1/2010 | Ranganathan | G06F 1/206 709/223 |
| 7,996,204 | B2 * | 8/2011 | Oslake | G06F 11/3414 703/13 |
| 8,010,337 | B2 * | 8/2011 | Narayanan | G06F 11/3419 703/22 |
| 8,458,500 | B2 * | 6/2013 | Akers | G06F 9/5027 713/300 |
| 8,555,287 | B2 * | 10/2013 | Ding | G06F 9/505 718/102 |
| 8,683,479 | B1 | 3/2014 | Arlitt et al. | |
| 2005/0125213 | A1 * | 6/2005 | Chen | G06F 11/3414 703/22 |
| 2006/0259621 | A1 * | 11/2006 | Ranganathan | G06F 1/206 709/226 |
| 2008/0005332 | A1 * | 1/2008 | Pande | G06F 9/4843 709/226 |
| 2009/0106008 | A1 | 4/2009 | Branson et al. | |
| 2010/0131959 | A1 * | 5/2010 | Spiers | G06F 9/50 718/105 |
| 2010/0191854 | A1 | 7/2010 | Isci et al. | |
| 2012/0259976 | A1 | 10/2012 | Bhagat et al. | |
| 2013/0283102 | A1 | 10/2013 | Krajec et al. | |

FOREIGN PATENT DOCUMENTS

DE       10 2012 217202 A1    4/2013

OTHER PUBLICATIONS

Becerra et al. "Batch Job Profiling and Adaptive Profile Enforcement for Virtualized Environments", 2009 IEEE, pp. 414-418.*
Tsubouchi et al. "A Research on Predicting the Operation Function for the Workflow-Based Knowledge Management Software", 2008 IEEE, pp. 823-828.*
Voorst "Profiling the Communication Workload of an iPSC/SSO", 1994 IEEE, pp. 221-228.*
International Search Report and Written Opinion regarding PCT/US2015/022644, dated Jun. 25, 2015.

* cited by examiner

*Primary Examiner* — Van Nguyen
(74) *Attorney, Agent, or Firm* — Polsinelli PC

(57) ABSTRACT

Methods and/or systems for performing workload analysis within an arrangement of interconnected computing devices, such as a converged infrastructure, are disclosed. A prediction system may generate a workload associated with physical and/or logical components of the converged infrastructure that are utilized to execute a client resource. The prediction system may monitor the utilization behavior of the various logical and/or physical components associated with the workload over a particular period of time to generate a workload profile. Subsequently, the prediction system may execute a prediction workload analysis algorithm that accesses the workload profile to identify optimal physical resources in the converged infrastructure that may be available to execute other workloads.

15 Claims, 3 Drawing Sheets

SYSTEMS AND METHODS FOR PHYSICAL AND LOGICAL RESOURCE PROFILING, ANALYSIS AND BEHAVIORAL PREDICTION

TECHNICAL FIELD

Aspects of the present disclosure relate to workload analysis, and in particular, to the generation of workload profiles for physical and/or logical computing components.

BACKGROUND

Large scale information technology ("IT") organizations such as those typically found in enterprise-class organizations and service providers, have embraced virtualization and cloud computing as mechanisms for providing various computing services to users in a more efficient and manageable manner. Virtualization techniques transform a physical computing component, such as a physical server, into multiple "virtual" components. Cloud computing techniques allow an IT organization to host and deliver applications in the form of services to users over a network. Virtualization and cloud computing concepts typically require an IT organization to run numerous applications on hundreds or even thousands of virtual components that are located on or otherwise associated with globally disparate physical resources. As a result, time-consuming and labor-intensive coding is required to enable the IT organization to understand the characteristics and behaviors of its virtualized computing components in relation to its physical resources and/or applications.

SUMMARY

Aspects of the present disclosure involve systems, methods, and/or non-transitory computer-readable mediums for performing workload analysis. The methods include generating a workload profile corresponding to at least one physical component of a converged infrastructure that is utilized to enable at least one client resource to function. The methods further include applying the workload profile to obtain utilization data corresponding to the at least one physical component for a period of time. The methods include performing a predictive workload analysis on the utilization information to identify at least one optimal physical component in the converged infrastructure capable of executing another client resource at a different period of time.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure include methods and/or systems for performing predictive workload analysis on an interconnected set of physical and/or logical computing components, such as various compute, network, and/or storage components, any of which may be included as a part of a converged infrastructure. A workload defines the activities and processes executed by a computing system (CPU, network, storage), that are utilized or otherwise consumed by a client resource, such as a user-driven application. Workload predictive analysis involves the prediction of future workload requirements of such a computing system and the ability to implement changes to the computing system in response to the prediction.

In various aspects, a prediction system may generate a workload profile associated with the one or more physical and/or logical components that are utilized to enable the functioning of one or more client resources (e.g. a software application). The prediction system may monitor, collect, interrelate, and/or interpret the processing/usage behavior information corresponding to the various logical and physical resources associated with the workload profile for a specific period of time (utilization data). Once utilization data has been obtained, the prediction system may execute a prediction workload analysis algorithm that processes the utilization data to identify optimal physical resources that may be available to execute specific workloads corresponding to other client resources at a particular point in time. The utilization data may also serve as the basis for various types of automatic reporting, such as granular showback and/or chargeback reporting, that further illustrates how the physical resources may be operating.

In other aspects, the prediction system may consume utilization data from multiple and disparate systems and thereby extend its assessment and prediction capabilities to multiple, globally disperse, components for purposes of measurement, monitoring, and/or optimal workload placement.

Figure 1:
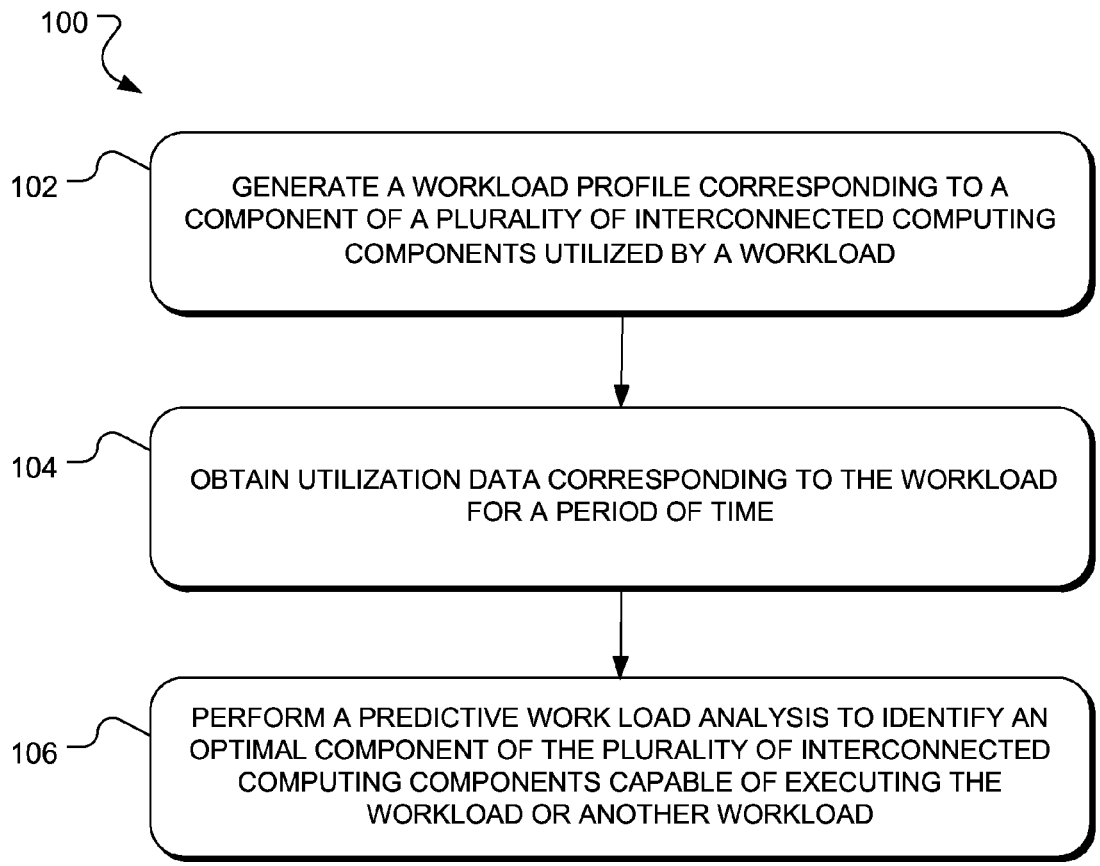
FIG. 1 is a flowchart illustrating an example process for performing workload analysis, according to aspects of the present disclosure.
Figure 2A:
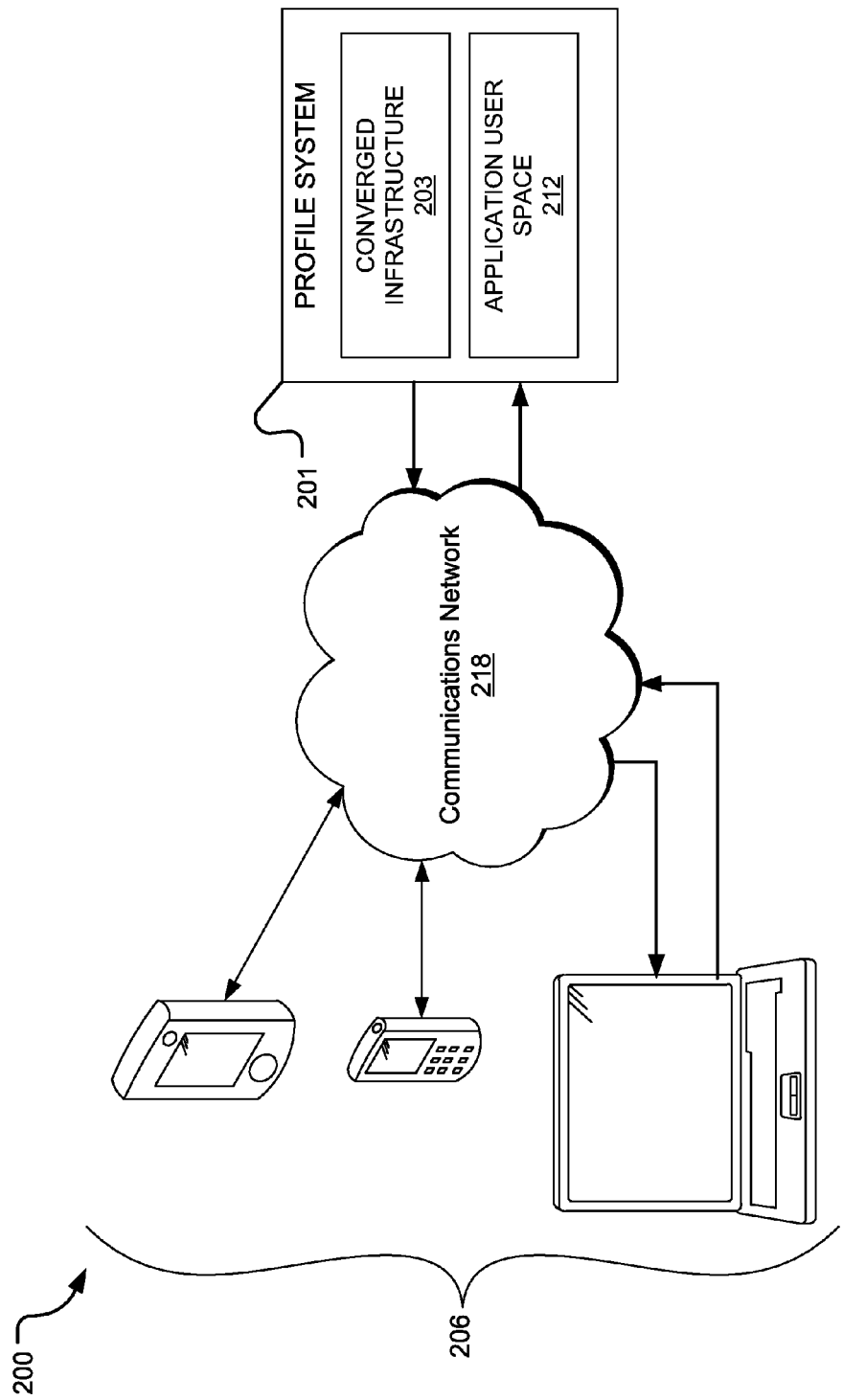
FIGS. 2A-2B are block diagrams illustrating a computing environment for performing workload analysis, according to aspects of the present disclosure.
Figure 2B:
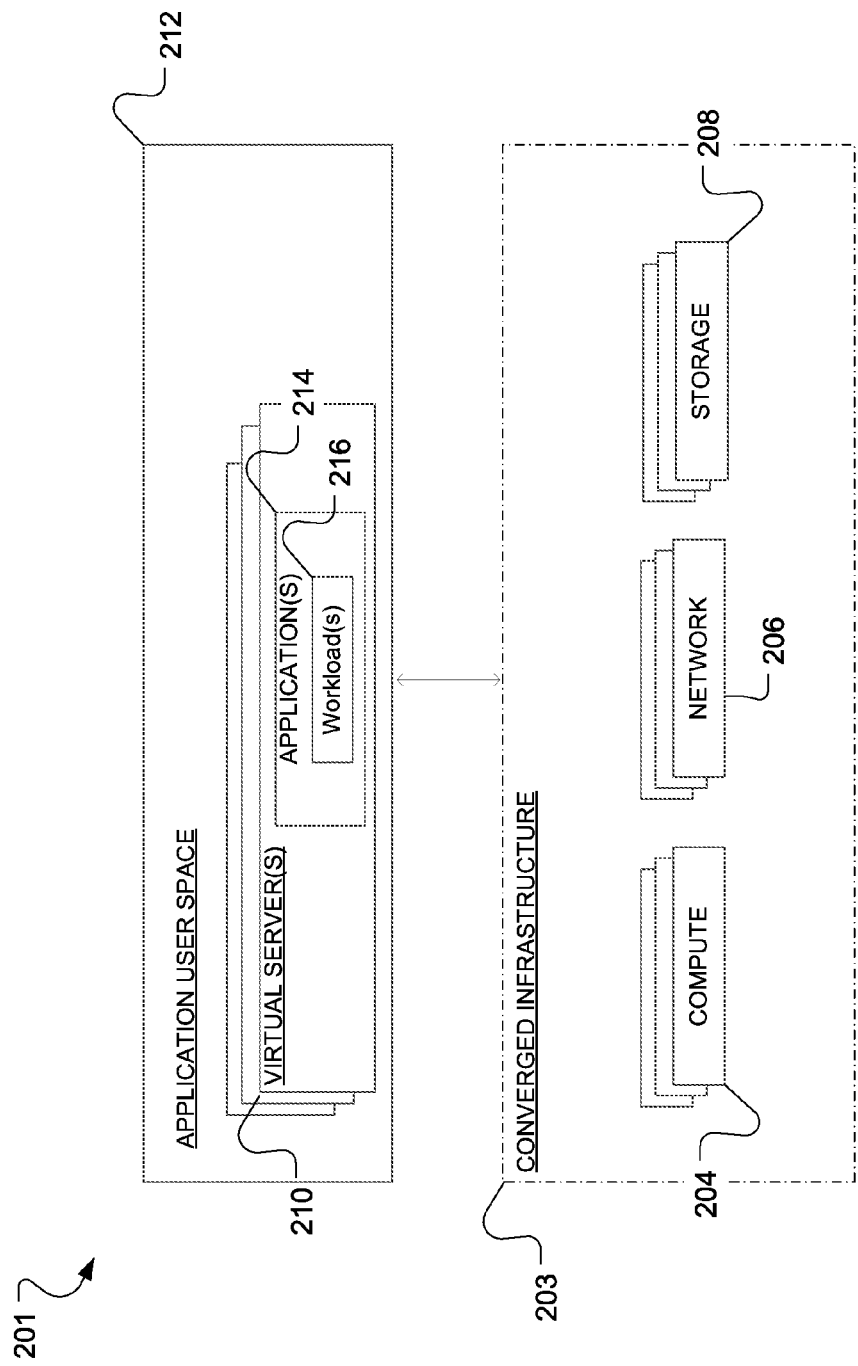

An illustrative process and/or system for performing predictive workload analysis for various client resources, is depicted in FIGS. 1 and 2A-2B. FIG. 1 illustrates an example process 100 for performing predictive workload analysis. FIGS. 2A and 2B illustrate a computing architecture 200 including hardware and/or software components that may be used to perform or otherwise execute the process 100 of FIG. 1.

Referring generally to FIGS. 2A-2B and initially to FIG. 2A, the computing architecture 200 includes a prediction system 201 configured to perform predictive workload analysis on pools of physical, virtual, and/or logical computing components including, but not limited to, compute, network, and storage components. The prediction system 201 may include one or more central processing units (CPUs) (e.g., a plurality of processors in a parallel processing environment), a cache, a system memory and a system bus that operatively couples various system components including the cache and the system memory to the processor. The prediction system 201 may further include a hard disk drive for reading from and writing to a persistent memory such as a hard disk, and an optical disk drive for reading from or writing to a removable optical disk such as a CD ROM, DVD, or other optical medium. The drives and their associated computer-readable medium provide nonvolatile storage of computer-readable instructions, data structures, program engines and other data for the prediction system 201. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment. Various other computing components may be included within the prediction system 201. For example, the prediction system 201 may contain various other hardware devices, such as chasses, fans, power supplies, and/or the like.

According to one embodiment, the pools of physical, virtual, and/or logical computing components, with which the prediction system 201 interacts to perform predictive workload analysis, may be logically arranged as a converged infrastructure 203. Generally speaking, converged infrastructures, also referred to as integrated infrastructure and other terms, involve multiple computing components pre-integrated into an optimized computing solution. The computing components of a converged infrastructure may include servers, data storage components, networking equipment and software for managing the integrated components. To assist in the scalability, management, and sharing of resources, particularly in large data center environments, converged infrastructures may involve a pool of server, storage and networking capacities, typically virtualized, that may be shared by multiple applications. While some aspects of the present disclosure are illustrated in the context of a converged infrastructure, aspects are not limited to such an environment The pooled computing components of the converged infrastructure 203 may be utilized by the client resources of an application user space 212 to provide services (e.g., applications as a service) to users at one or more client devices 206 over a communication network 218, which may be the Internet, an Intranet, and Ethernet network, a wireline network, a wireless network, and/or another communication network. For example, an IT administrator may use the prediction system 201 to monitor the specific computing components of the converged infrastructure 203 that are used/unused by the applications of the application user space 212. The client device(s) 206 may be a personal computer, work station, server, mobile device, mobile phone, tablet device, of any suitable type. In one particular embodiment, the converged infrastructure 203 may be a Vblock™ Systems converged infrastructure. While the illustrated embodiment depicts a converged infrastructure, it is contemplated that the aspects of the present disclosure may also be used in other types of infrastructures, such an integrated infrastructure, a cloud computing based data center, among others. Thus, the application user space 212 provides the information/data source location for the prediction system 201 to access. Moreover, any results generated by the prediction system 201 may be stored or otherwise maintained within the user space 212 as a basis for future workload modeling/optimization.

Referring now to FIG. 2B, according to one embodiment, the computing components pooled by the prediction system 201 and included within the converged infrastructure 203 may include one or more compute, network, and/or storage components 204-208 (collectively referred to herein as "computing components") that may be managed, monitored, logged, etc., by the prediction system 201. Stated differently, the prediction system 201 may include various instructions processes, software, and/or applications, which, when executed, may be configured to manage and monitor the computing components 204-208 of the converged infrastructure 203, such as for example, to determine whether a specific computing component 204-208 is being efficiently utilized. In one particular embodiment, the compute components 204 may include various physical components such as chasses, blade(s), ports, fans, power supplies, etc., and further, may include one or more logical components such as a hypervisor, operating systems, domain(s), and the like. The network components 206 may include various physical components such as switches, chasses, ports, interconnects, virtualizers, fans, blade(s), ports, etc., and further, may include various logical components such as zones, fabrics, virtual storage area networks, and the like. The storage components 208 may include various physical components, such as for example, arrays, disks, FAS data storage systems, and the like, and further may include various mapping, masking, and/or pooling logical components.

The converged infrastructure 203 may be logically connected to or otherwise in communication with (e.g. via a network) the application user space 212 that includes one or more virtual servers 210, application(s) 214, and workload(s) 216 (collectively referred to herein as "client resources"), any of which provide various computing services to end-users. In one embodiment, the application user space may be located within a converged infrastructure (not shown) different than the converged infrastructure 203.

The virtual servers 210 represent one or more virtualized servers. Generally speaking, server virtualization involves dividing one physical server into multiple isolated virtual environments, each individually referred to as a "virtual" server. Each virtual server includes the same components of the physical server in virtual form and is capable of performing the same function as the physical server from which the virtual server was generated. For example, if the physical server includes an operating system and database and is configured as a web server capable of hosting web pages, each virtual server would also contain the same database and operating system and further may be capable of functioning as a web server capable of hosting web pages. While the virtual servers are illustrated as being external to the converged infrastructure 203, it is contemplated that the virtual servers 210 and/or the application user space 212 may be maintained locally as a part of the converged infrastructure 203.

Each virtual server 210 may include an application(s) 214 that may access to the various resources within the virtual server (e.g. the database and operating system) in order to properly execute. Each application(s) 214 may include a workload(s) 216. A workload defines the type and/or amount (e.g. average) of processing/usage a computing component may perform or otherwise handle at a particular instance of time. The amount of processing handled by a computing component may provide an estimate of the efficiency and performance of that particular computing component. For example, a workload 216 for a memory component may determine the specific amount of memory use of a computing system/architecture in which the memory component is included over a specific period of time, or at a specific instant in time. When the system's memory usage becomes so large that memory becomes a bottleneck for performance, the workload 216 indicates more memory may be needed, or system uses (e.g. the execution of software applications) may be managed in a more effective manner. As another example, a processor workload 216 indicates the number of instructions being executed by the processor of a computing system/architecture in which the processor component is included over a specific period of time, or at a specific instant in time. Such a workload indicates a need for an increase in processing power if the processor component is overloaded, or a decrease in processing power if processor component falls below a certain threshold. Thus, any workload 216 may be defined as, or otherwise include, a benchmark or threshold when evaluating the computing component in terms of performance (e.g. how easily the computer handles the workload).

Referring now to FIG. 1, a process for performing predictive workflow analysis is provided. As illustrated, process 100 begins with generating a workload profile corresponding to a component (physical and/or logical) of a plurality of interconnected components utilized by a workload. The workload is associated with, or otherwise utilized by a client resource, such as a software application, to enable the client resource to function (operation 102). For example, the workload profile may be generated corresponding to a computing component of the converged infrastructure 203 required by the workload.

A user interested in generating a workload profile may access a client device 206 to initiate a workload profile generation request for generating a workload profile, which may be received by the prediction system 201. The prediction system 201 may transmit instructions to the one or more client devices 206 that may be processed and/or executed to generate, or otherwise display, one or more interactive interfaces or input forms (e.g. a user-interface) for configuring one or more components and/or attributes corresponding to a workload. The various user-interfaces may include interactive elements, such as buttons, forms, fields, selections, inputs, streams, etc., for receiving input to configure or otherwise identify the physical and/or logical components of the converged infrastructure 203 corresponding to the workload. Alternatively, in some embodiments, the workload may already exist and may be accessed from a remote location, such as an external database.

In one embodiment, a user may interact with the generated user-interfaces to select or otherwise identify a metric, or subset of metrics, which when evaluated, assesses the performance of the client resource and the physical and/or logical components of the converged infrastructure to which the workload profile corresponds. Such metrics may include: capacity (CPU cycles, memory, storage, IP addresses, temperature, watts, ports, etc.), health (state, error counters, etc.), and throughput (bandwidth, I/O rate, etc.). Additionally, the user may interact with the various user-interfaces to define one or more rules corresponding to the identified metrics, and further, associate a service that may be consumed based upon the outcome of the defined rule.

An illustrative example for generating a workload profile will now be provided. Assume a user interacts with the various user-interfaces to identify the power-consumption metrics corresponding to the power consumption of various computing components included within the converged infrastructure 203. More specifically, the user interacts with the user-interfaces to associate one or more power-consumption metrics, including watts consumed per unit time, watt usage trends/peaks, and/or power-consumption threshold crossing, with a workload. The metrics could be used to determine whether the various components within the converged infrastructure are performing as required by a service level agreement and/or a service level object in a service level agreement, or in predicting workload chargeback solutions (per-workload). Additionally, the user may interact with the user-interface to associate one or more rules with the identified metrics. For example, the user interacts with the user-interface to associate the "watts consumed per unit time" metric with a rule that shifts a workload to specific computing components that consume lower watts during a specific time interval. As another example, the user may interact with the user-interface to associate a threshold rule with the workload profile. Stated differently, a threshold may be associated, which when satisfied, will trigger event. For example, a threshold may trigger an event that automatically initiates a service, such as a user-indicated information technology service, or some other service and/or service orchestration mechanism. In another example, if a workload threshold "X" is met, an event may be triggered that automatically causes a provisioning script to be invoked that automatically provisions various computing components within the converged infrastructure 203. The various event and rules within the workload profile may be managed by a rules engine that includes, manages, and executes one or more rules corresponding to the workloads and/or workload profiles. While various embodiments involving user-interfaces have been described, it is contemplated that in other embodiments, the various workload profiles and metrics may be generated or selected and/or processed automatically by the prediction system 201.

Referring back to FIG. 1, once a workload profile has been generated, the workload corresponding to the workload profile is applied to obtain utilization data corresponding to the component (i.e. the physical and/or logical resources) associated with the workload profile and the workload (operation 104). Specifically, the prediction system 201 understands, monitors, collects, interrelates, and stores resource utilization behavior information (referred to as "utilization data") corresponding to any metrics identified in the workload profile, such as power consumption, thermal consumption, memory usage, CPU usage, connectivity, and/or the like, for the physical and/or logical components (e.g. computing components 204-208) associated with the workload corresponding to the workload profile over a particular period of time, such as every 30 seconds, every hour, every 6 hours, every week, and/or any other type of temporal delineation.

Once utilization data for a workload has been obtained, a predictive workload analysis may be performed to identify at least one optimal component in the plurality of interconnected computing components that is capable of executing the workload, or a different workload (operation 106). In one embodiment, the prediction system 201 may process the utilization data corresponding to the component of the computing components 204-208 included within the converged infrastructure 203 and apply the data to the workload profile rules to initiate one or more events. For example, the prediction system 201 may process a workload profile for a first server that indicates that the first server is currently running several applications (i.e. executing a workload) that are consuming too much power and therefore incurring overly expensive power consumption costs. Stated differently, the workload profile may include a power-consumption threshold, which when breached or otherwise satisfied, indicates that a different server (or other component) that does not satisfy the power consumption threshold should execute the workload. Based on such an analysis of the workload profile (i.e. the rules and the metrics), the prediction system 201 may identify a second server that is currently consuming less power. The first server may then initiate the offloading of one or more of its applications to the second server in order to decrease power consumption, resulting in lower combined power consumption costs.

Thus, various aspects of the present disclosure involve performing a workload analysis on logical and physical resources associated with converged infrastructures that are utilized to execute client resources (e.g. a software application). The utilization behaviors of the various logical and physical resources are monitored over a particular period of time and analyzed to predict and identify the optimal physical resources in the converged infrastructure that may be available to the same or similar workloads.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for performing workload analysis comprising:
generating, using at least one processor, a workload profile comprising a first metric, the workload profile corresponding to at least one component of a plurality of interconnected computing components, the at least one component utilized by a first workload corresponding to at least one client resource;
obtaining, using the at least one processor, utilization data corresponding to the first metric; and
based on the utilization data, performing, using the at least one processor, a predictive workload analysis to identify at least one optimal component in the plurality of interconnected computing components capable of executing a second workload by:
applying the first metric to a threshold to determine whether the threshold has been satisfied, the threshold corresponding to the first workload; and
when the threshold has been satisfied, identifying the at least one optimal component capable of executing the second workload by determining that a different workload profile comprising a second metric does not satisfy the threshold, the different workload profile corresponding to the optimal component,
wherein obtaining the utilization data comprises monitoring the first metric over a period of time.

2. The method of claim 1 wherein the plurality of interconnected computing components are included in a converged infrastructure.

3. The method of claim 1, wherein the first metric is a power-consumption metric and the threshold is a watts consumer per unit of time threshold.

4. The method of claim 1, further comprising:
displaying a graphical-user-interface for generating the workload profile; and
providing the optimal component and the predictive workload analysis for display at the graphical-user-interface.

5. The method of claim 1, wherein the at least one client resource is a virtual server and wherein the component is at least one of a networking component, storage component, or a compute component.

6. A system for performing workload analysis comprising:
at least one processor to:
generate a workload profile comprising a first metric, the workload profile corresponding to at least one component of a plurality of interconnected computing components, the at least one component utilized by a first workload corresponding to at least one client resource;
obtain utilization data corresponding to the first metric; and
based on the utilization data, perform a predictive workload analysis to identify at least one optimal component in the plurality of interconnected computing components capable of executing a second workload by:
applying the first metric to a threshold to determine whether the threshold has been satisfied, the threshold corresponding to the first workload; and
when the threshold has been satisfied, identifying the at least one optimal component capable of executing the second workload by determining that a different workload profile comprising a second metric does not satisfy the threshold, the different workload profile corresponding to the optimal component, wherein to obtain the utilization data comprises monitoring the first metric over a period of time.

7. The system of claim 6, wherein the plurality of interconnected computing components are included in a converged infrastructure.

8. The system of claim 6, wherein the first metric is a power-consumption metric and the threshold is a watts consumer per unit of time threshold.

9. The system of claim 6, wherein the at least one processor is further configured to:
display a graphical-user-interface for generating the workload profile; and
provide the optimal component and the predictive workload analysis for display at a graphical-user-interface.

10. The system of claim 6, wherein the at least one client resource is a virtual server and wherein the component is at least one of a networking component, storage component, or a compute component.

11. A non-transitory computer-readable medium encoded with instructions for performing workload analysis, the instructions, executable by a processor, comprising:
generating a workload profile comprising a first metric, the workload profile corresponding to at least one component of a plurality of interconnected computing components, the at least one component utilized by a first workload corresponding to at least one client resource;
obtaining utilization data corresponding to the first metric; and
based on the utilization data, performing a predictive workload analysis to identify at least one optimal component in the plurality of interconnected computing components capable of executing a second workload by:
applying the first metric to a threshold to determine whether the threshold has been satisfied, the threshold corresponding to the first workload profile; and
when the threshold has been satisfied, identifying the at least one optimal component capable of executing the second workload by determining that a different workload profile comprising a second metric does not satisfy the threshold, the different workload profile corresponding to the optimal component, wherein obtaining utilization data comprises monitoring the first metric over a period of time.

12. The non-transitory computer-readable medium of claim 11, wherein the plurality of interconnected computing components are a part of a converged infrastructure.

13. The non-transitory computer-readable medium of claim 11, wherein the first metric is a power-consumption metric and the threshold is a watts consumer per unit of time threshold.

14. The non-transitory computer-readable medium of claim 11, further comprising:

displaying a graphical-user-interface for generating the workload profile; and providing the optimal component and the predictive workload analysis for display at the graphical-user-interface.

15. The non-transitory computer-readable medium of claim 11, wherein the at least one client resource is a virtual server and wherein the component is at least one of a networking component, storage component, or a compute component.

\* \* \* \* \*